(12) United States Patent
Kakizaki et al.

(10) Patent No.: US 7,441,142 B2
(45) Date of Patent: Oct. 21, 2008

(54) DATA TRANSFER METHOD AND REMOTE COPY SYSTEM

(75) Inventors: Yoshio Kakizaki, Fujisawa (JP); Masahiro Horiba, Odawara (JP); Homare Okamoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 517 days.

(21) Appl. No.: 11/331,084

(22) Filed: Jan. 13, 2006

(65) Prior Publication Data

US 2007/0094530 A1 Apr. 26, 2007

(30) Foreign Application Priority Data

Oct. 21, 2005 (JP) ............... 2005-307670

(51) Int. Cl.
*G06F 11/00* (2006.01)
(52) U.S. Cl. .......................................... 714/4; 709/217
(58) Field of Classification Search .............. 714/4, 714/15; 370/236, 235; 709/217, 232
See application file for complete search history.

(56) References Cited

U.S. PATENT DOCUMENTS 5,610,745 A * 3/1997 Bennett ................... 398/52
6,192,054 B1 * 2/2001 Chan et al. ................ 370/452
6,859,437 B2 * 2/2005 Miller et al. .............. 370/235
7,085,846 B2 * 8/2006 Jenne et al. ............... 709/232
2003/0227874 A1 * 12/2003 Wang ....................... 370/236

FOREIGN PATENT DOCUMENTS

| JP | 07-152677 | 6/1995 |
|---|---|---|
| JP | 11-055314 | 2/1999 |

* cited by examiner

*Primary Examiner*—Dieu-Minh Le
(74) *Attorney, Agent, or Firm*—Mattingly, Stanger, Malur & Brundidge, P.C.

(57) ABSTRACT

A data transfer method for transferring data frames according to Fibre Channel Protocol between a first storage control unit and a second storage control unit in a remote copy system, wherein the remote copy system includes a first storage control unit, and a second storage control unit connected via a communication tool to the first storage control unit, that receives data from the first storage control unit. A buffer-to-buffer credit value applied to the data frame transfer is increased according to the distance between the first storage control unit and the second storage control unit.

10 Claims, 9 Drawing Sheets

| DISTANCE BETWEEN A_Port AND B_Port | BAND | BB CREDIT : n' |
|---|---|---|
| 100Km | 1GHz | a1 |
|  | 2GHz | a2 |
|  | 4GHz | a3 |
| 150Km | 1GHz | a4 |
|  | 2GHz | a5 |
|  | 4GHz | a6 |
| 200Km | 1GHz | a7 |
|  | 2GHz | a8 |
|  | 4GHz | a9 |
| 250Km | 1GHz | a10 |
|  | 2GHz | a11 |
|  | 4GHz | a12 |
| 300Km | 1GHz | a13 |
|  | 2GHz | a14 |
|  | 4GHz | a15 |
| 350Km | 1GHz | a16 |
|  | 2GHz | a17 |
|  | 4GHz | a18 |
| 400Km | 1GHz | a19 |
|  | 2GHz | a20 |
|  | 4GHz | a21 |

DATA TRANSFER METHOD AND REMOTE COPY SYSTEM

CROSS-REFERENCES TO RELATED APPLICATIONS

This application relates to and claims priority from Japanese Patent Application No. 2005-307670, filed on Oct. 21, 2005 the entire disclosure of which is incorporated herein by reference.

BACKGROUND OF THE INVENTION

The present invention relates to a method for transferring data between a plurality of nodes according to Fibre Channel Protocol. More particularly, this invention relates to a method and apparatus for controlling data frame transfer according to Fibre Channel Protocol, that is applied to a remote copy system including a plurality of storage control units separated by a great distance.

If a data center providing continuous service using applications breaks down due to any cause such as a disaster or accident, in present-day society, where computer systems are vital for any organization, it is very important to provide the continuous service by using another data center.

Therefore, a remote copy system includes a storage control unit that is located at a geographical location away from the first storage control unit, and that is designed to store a duplicate of data stored in the first storage control unit.

In this remote copy system, data transfer from a storage control unit to another storage control unit at a remote site is conducted according to Fibre Channel Protocol. In order to establish a long-distance connection between an initiator node and a target node according to Fibre Channel Protocol, it is necessary to consider the buffer-to-buffer credit (BB credit) defined by Fibre Channel layer 2 (FC-2). Specifically speaking, when data transfer is conducted by a storage control unit at a local site logging into a storage control unit at a remote site, the number of data frames that can be received at once by the storage control unit at the remote site is determined by the BB credit, which is one of the parameters at the time of login.

As an example of this kind of technique, there is a data transfer control method disclosed in JP-A-11-55314. By this method, a sender checks a frame sequence number sent to the sender and a frame sequence number indicating which processing performed by a receiver has terminated, thereby obtaining the BB credit value. Moreover, as the sender ascertains the difference between the latest frame sequence number sent to the receiver and the latest frame sequence number indicating which processing performed by the receiver has terminated, the BB credit value is increased or decreased depending on the receiver's traffic situation.

Moreover, Japanese Patent No. 3517452 discloses a data transfer control method that aims to prevent reduced data transfer efficiency due to cable transfer delay time. This publication describes a storage control unit having a buffer sending a data request to a host system during a period of time after having issued a data request corresponding to the capacity of storage means until it receives first data transferred from the host system; and a target node returning the data request to an initiator node while anticipating cable transfer delay time.

According to Fibre Channel Protocol, if the BB credit value is "0," a sender FC port must not send the next frame to a receiver FC port until it receives R_RDY (Receiver_Ready). If the distance between the ports is small, the sender port can transfer data to the receiver port without being influenced by the delay time for propagation of the transfer data and R_RDY via the data transfer path.

On the other hand, if the data transfer path distance between these ports is great, reception of R_RDY by the sender port from the receiver port is delayed due to line delay. Consequently, if the buffer-to-buffer credit (BB credit) does not provide a sufficient number of buffers for the connection distance (or line delay), there is a problem of an increased time during which the sender FC port cannot send data frames, resulting in throughput reduction.

SUMMARY OF THE INVENTION

In order to solve the problem described above, this invention aims to provide data transfer control with no throughput reduction or no possibility thereof in data transfer between a sender port and a receiver port, even those separated by a great distance, for example, in the case where the sender port and the receiver port, between which data is transferred according to Fibre Channel Protocol, constitute a remote copy system between a plurality of storage control units.

In order to achieve the above-described object, the data transfer control method according to this invention for continuously transferring data between ports according to Fibre Channel Protocol is characterized in that the BB credit value declared by the sender node to the receiver node is increased according to the distance between the sender port and the receiver port.

According to a first aspect of the invention, provided is a data transfer method for transferring data frames according to Fibre Channel Protocol between a first storage control unit and a second storage control unit in a remote copy system, wherein the remote copy system includes the first storage control unit, which is connected to an information processor and sends and receives data to and from the information processor, and the second storage control unit, which is connected via a communication tool to the first storage control unit and receives data from the first storage control unit, and wherein a buffer-to-buffer credit value applied to the data frame transfer is increased according to the distance between the first storage control unit and the second storage control unit.

According to a second aspect of the invention, provided is a data transfer method for transferring data frames between an initiator node port and a target node port according to Fibre Channel Protocol, including: a first step of having the initiator node log into the target node based on a predetermined buffer-to-buffer credit value; a second step of deciding a buffer-to-buffer credit value according to a control table that associates the distance between the initiator node port and the target node port, with the buffer-to-buffer credit value to be applied to the data transfer; and a third step of setting the buffer-to-buffer credit value to be actually applied to the data transfer between the initiator node port and the target node port, to the value decided in the second step if the predetermined buffer-to-buffer credit value in the first step is equal to or less than the buffer-to-buffer credit value decided in the second step.

According to a third aspect of the invention, provided is a remote copy system including: a first storage control unit that is connected to an information processor, that sends and receives data to and from the information processor; a second storage control unit that is connected via a communication tool to the first storage control unit, that receives data from the first storage control unit; a copy control circuit for remote-copying a logical volume in the first storage control unit to a logical volume in the second storage control unit; and a transfer control circuit for transferring data frames in the first storage control unit to the second storage control unit according to Fibre Channel Protocol; wherein the transfer control circuit increases a buffer-to-buffer credit value to be applied to the data transfer, according to the distance between the first storage control unit and the second storage control unit.

According to aspects of the invention, the buffer-to-buffer credit (BB credit) value is increased or decreased depending on the condition of data transfer or data processing at the nodes during the data transfer between ports in a plurality of nodes according to Fibre Channel Protocol. Therefore, it is possible to achieve efficient data transfer.

As described above, this invention can realize data transfer control with no throughput reduction or no possibility thereof in data transfer between a sender port and a receiver port, even those separated by a great distance, for example, in the case where the sender port and the receiver port, between which data is transferred according to Fibre Channel Protocol, constitute a remote copy system between a plurality of storage control units.

DETAILED DESCRIPTION OF THE INVENTION

Figure 1:
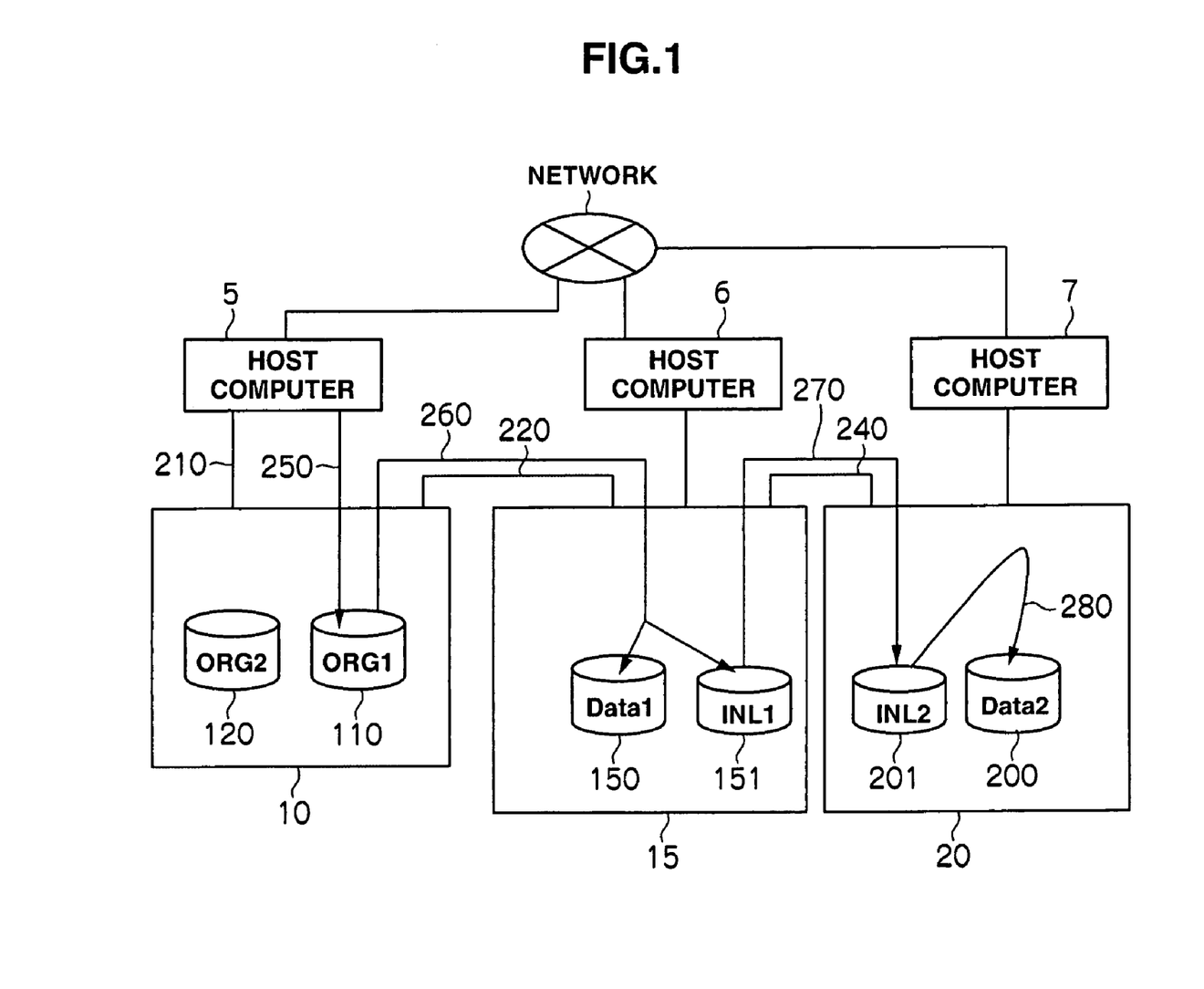
FIG. 1 is a hardware block diagram illustrating a remote copy system according to an embodiment of this invention.
Figure 2:
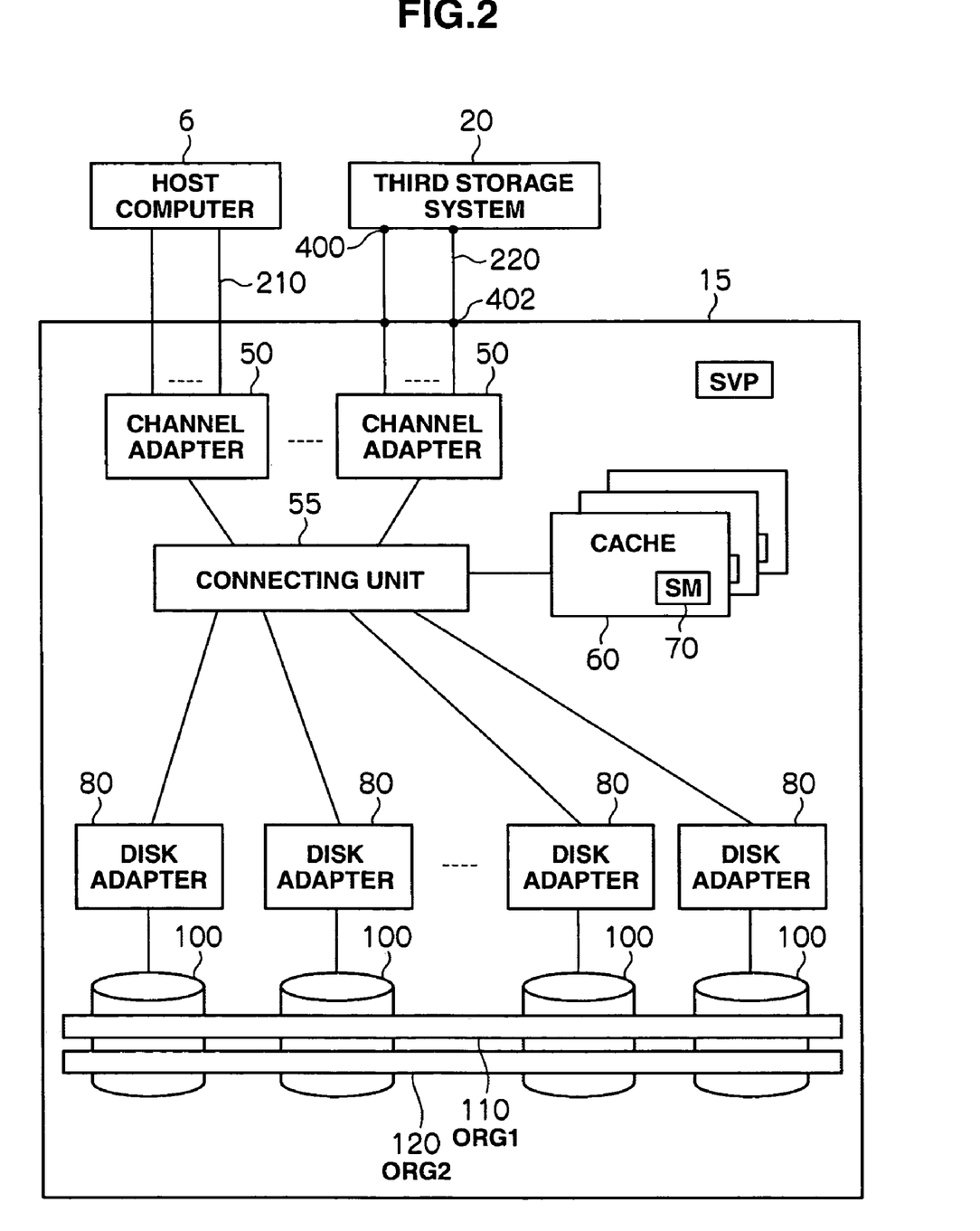
FIG. 2 is a hardware block diagram of a storage control unit.

FIG. 1 is an overall view of a remote copy system including a plurality of storage systems according to an embodiment of this invention. Each storage system is composed of a storage control unit as shown in FIG. 2. A first storage system 10 is connected via a connecting cable 210 to a host computer 5. A second storage system 15 is connected via a connecting cable 220 to the first storage system 10. This second storage system 15 functions as an intermediate site between the first storage system 10 and the third storage system 20.

A system incorporating a first site composed of the host computer 5 and the first storage system 10, and a second site composed of a host computer 6 and the second storage system 15, constitutes a local site. On the other hand, the third storage system 20 constituting a remote site that can be located hundreds of kilometers or more away from the local site is connected via a connecting cable 240 to the second storage system 15. Data communication according to Fibre Channel Protocol is conducted between the first storage system 10 and the second storage system 15, and between the second storage system 15 and the third storage system 20.

The first storage system 10 includes a logical volume 110 (ORG 1) and a logical volume 120 (ORG 2). The logical volume 110 (ORG 1) stores original data, i.e., a duplication target. The second storage system 15 includes the logical volume 150 (Data 1) to which a data image of the logical volume 110 (ORG 1) is synchronously copied. The storage system 20 at the remote site includes a logical volume 200 (Data 2) that will store duplicate data.

The capacities and physical storage positions (physical addresses) of the logical volumes as defined in the storage systems 10, 15, and 20 can be set using a management computer (SVP) or the host computer 5, 6 or 7 connected to each storage system. The logical volume in which duplication target data are accumulated is a primary logical volume, while the logical volume in which duplicate data are accumulated is a secondary logical volume. A primary logical volume and a secondary logical volume constitute a copy pair.

Referring to FIG. 1, when the first storage system 10 receives, from the host computer 5, an update command (write command) regarding data in the primary logical volume 110 (ORG 1) in the first storage system 10 (as indicated by arrow 250), the data in the primary logical volume 110 (ORG 1) in the first storage system 10 is updated. Then the logical volume 150 (Data 1) of the second storage system 15, which forms a pair with the updated primary logical volume 110, is synchronously updated. Consequently, even if a failure occurs in the first storage system 10, the second storage system 15 can immediately take over the services provided by the first storage system 10. This is because the second storage system 15 retains the secondary logical volume 150 (Data 1), which has the same data image as that of the primary logical volume 110 (ORG 1) used by the host computer 5.

On the other hand, when the data of the logical volume 150 (Data 1) is updated in the second storage system 15 at the second site, i.e., when the host computer 5 sends a data update I/O to the logical volume 110, the second storage system 15 stores journal data in the journal volume 151 (JNL 1) (as indicated by arrow 260). The journal data accumulated in the journal volume 151 (JNL 1) are transferred asynchronously via the connecting cable 240 to the journal volume 201 (JNL 2) in the third storage system 20 located a great distance away (as indicated by arrow 270). The third storage system 20 reproduces the logical volume 200 (Data 2) corresponding to the logical volume 150 (Data 1) in the second storage system 15 by using the journal data of the journal volume 201 (JNL 2).

FIG. 2 shows the hardware block configuration of the storage system 15. The storage systems 10 and 20 have similar configurations. The second storage system 15 has a plurality of channel adapters 50 for connection with the host computer 6. These channel adapters 50 are connected via the connecting cables 210 and 220 to the host computer 6 and the third storage system 20. The channel adapters 50 are connected via a connecting unit 55 to cache memory 60, analyze commands received from a host system (or information processor), and control reading or writing data from or to the cache memory 60 desired by the host computer. The logical volume 110 (ORG 1) and the logical volume 120 (ORG 2) are set across a plurality of HDDs 100. Reference numeral "80" represents a disk adapter. The disk adapters 80 control data sending and receiving between the channel adapters 50 and the HDDs 100. Reference numeral "70" represents shared memory for supplying control information to the channel adapters 50 and the disk adapters 80.

The channel adapters 50 send and receive data and commands to and from the disk adapters 80, the cache memory 60, and the shared memory 70, and a management terminal (SVP). The SVP is connected to the channel adapters 50 and the disk adapters 80. I/O requests, corresponding to file access requests, are output by a control circuit in the channel adapter 50.

Figure 3:
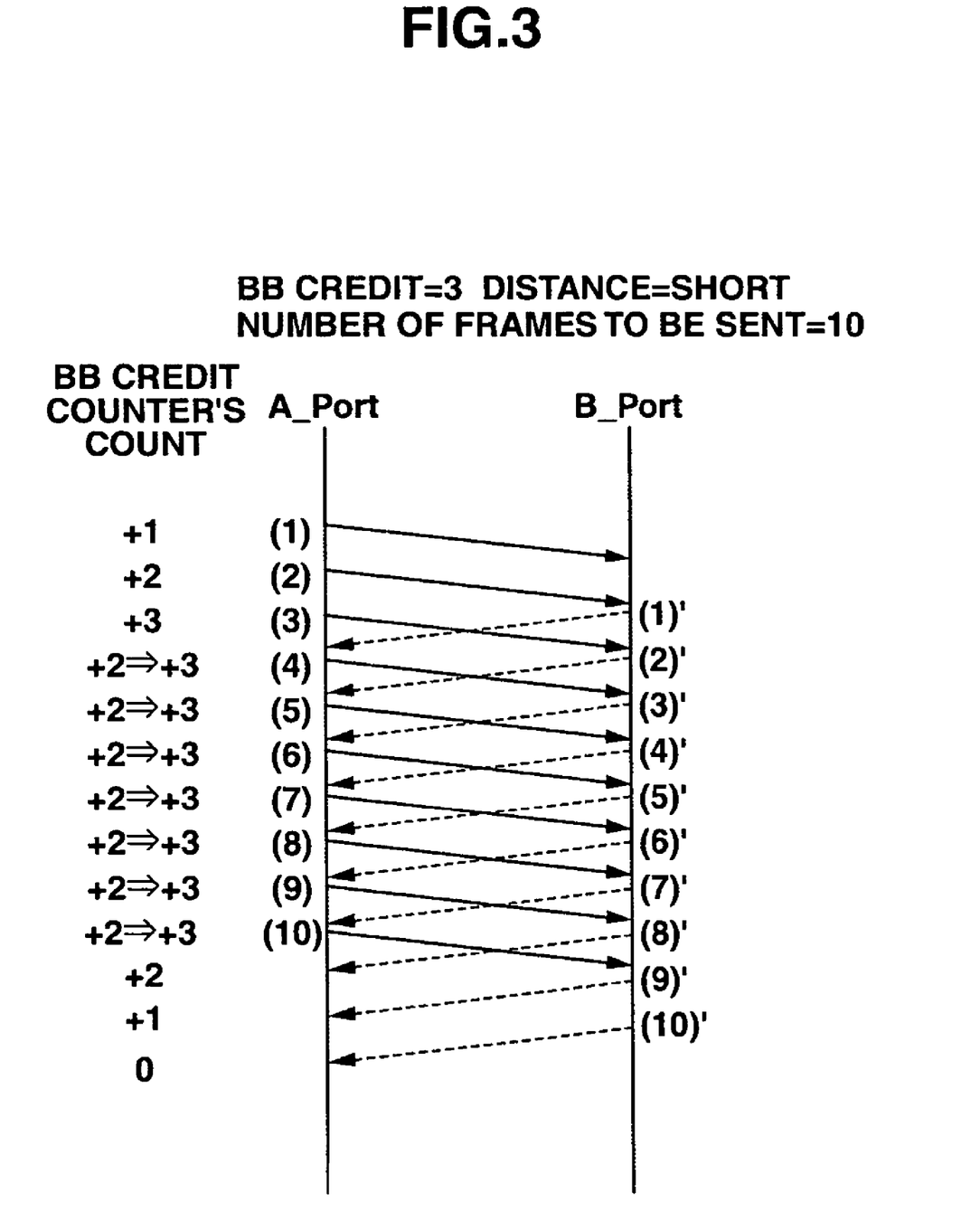
FIG. 3 is a timing chart illustrating a pattern for data frame transfer between a sender port and a receiver port (over a short distance).

Next, an embodiment of this invention is described where the second storage system is a sender node and the third storage system is a receiver node. When data is transferred from A_Port 402 on the second storage system 15 to B_Port 400 on the third storage system as shown in FIG. 2, and if the settings are made as shown in FIG. 3 where the conditions: "BB credit value =3" and "number of frames to be sent =10" are applied and the data transfer distance between A_Port and B_Port is small, A_Port can send the data to B_Port without the influence of a delay time for propagation of the transfer data and R_RDY via the data transfer path.

Referring to FIG. 3, "BB credit counter's count" is determined by a microprocessor 112 in the channel adapter 50 based on a microprogram in local memory 114. When a frame is transferred from A_Port to B_Port (as indicated with a full line), the count value is incremented by one.

On the other hand, when the microprocessor at A_Port receives R_RDY from B_Port (as indicated with a dashed line), the BB credit count value is decremented. When the BB credit count value becomes "3," the microprocessor at A_Port cannot send any frames to the storage system at B_Port. In FIG. 3, numbers (1) through (10) represent frames sent from A_Port to B_Port, and numbers (1)' through (10)' represent R_RDY sent from B_Port to A_Port.

Figure 4:
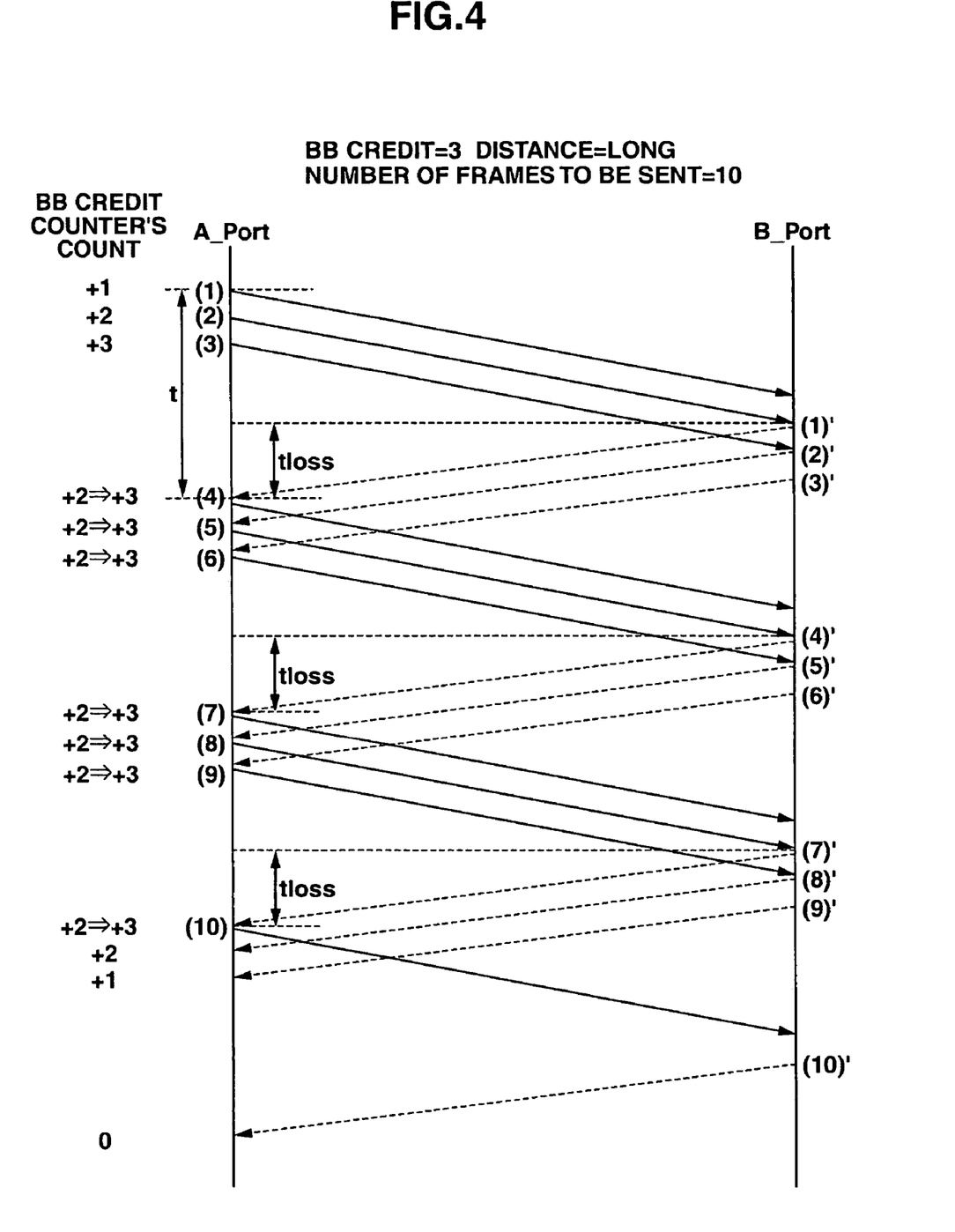
FIG. 4 is a timing chart illustrating a pattern for data frame transfer between a sender port and a receiver port (over a long distance).

If the distance between A_Port and B_Port is great, like a remote copy system, and where "t" represents the time required from the transmission of data from A_Port to B_Port, to the reception of R_RDY by A_Port from B_Port when transferring the data frames from the sender A_Port to the receiver B_Port as shown in FIG. 4, A_Port cannot send any data frame to B_Port during the time (indicated as "tloss") required for the return of R_RDY from B_Port to A_Port. During this time period, the buffer at the storage system on the B_Port side becomes empty, lowering data transfer efficiency.

The BB credit value is decided based on the buffer amount received by the node (storage system) having the receiver port. When the sender storage system logs into the receiver storage system, the receiver storage system notifies the sender storage system of the BB credit value. The sender storage system sends, to the receiver storage system, data frames in an amount equal to the notified BB credit value. A "buffer" is a temporary storage area for data frames. The cache memory or the local memory of the channel adapter on the receiver side is deemed a buffer.

Figure 5:
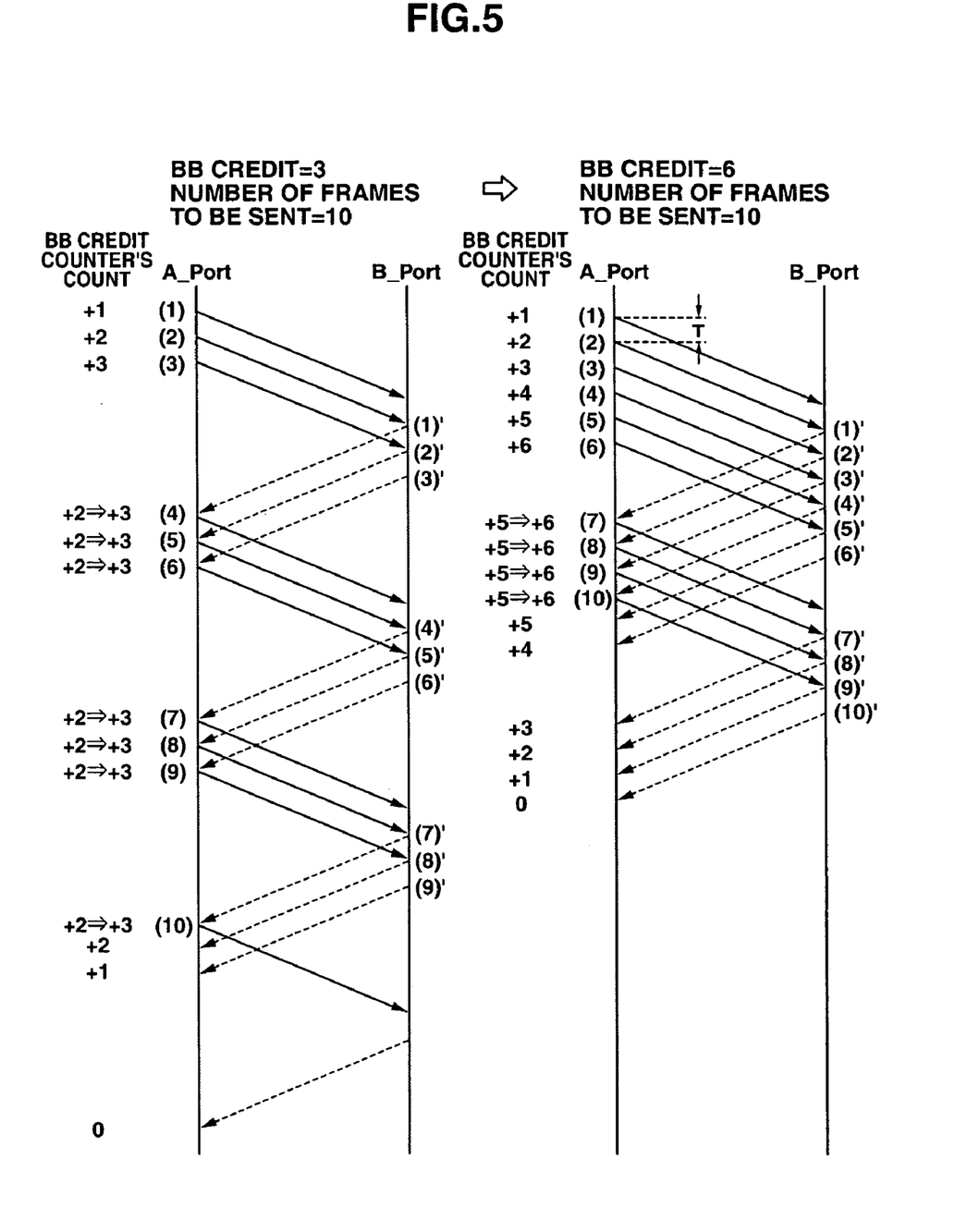
FIG. 5 shows timing charts illustrating data frame transfer patterns before and after a BB credit value increase.

In order to improve the data transmission efficiency, the BB credit value at the time of first login by the sender storage system into the receiver storage system is changed from "3," which can be processed by the storage system on the B_Port side, to "6" for example, and the sender storage system then logs into the receiver storage system again. In other words, during the period of time from the start of login to the completion of re-login, a larger number of data frames than are normally sent are transferred from A_Port to B_Port while anticipating the state where the buffer in the storage system on the B_Port side is empty. Of the six frames sent from the sender A_Port, three frames cannot be processed by the storage system on the B_Port side immediately. Accordingly, data in those three frames are buffered in the transfer path between A_Port and B_Port. For example, the three frames are buffered by a fabric's buffer in the middle of the transfer path; and after the buffer frames in the storage system on the B_Port side are transferred to the HDD and the buffer is made available, the three frames retained in the fabric's buffer are incorporated into the storage system on the B_Port side.

Figure 6:
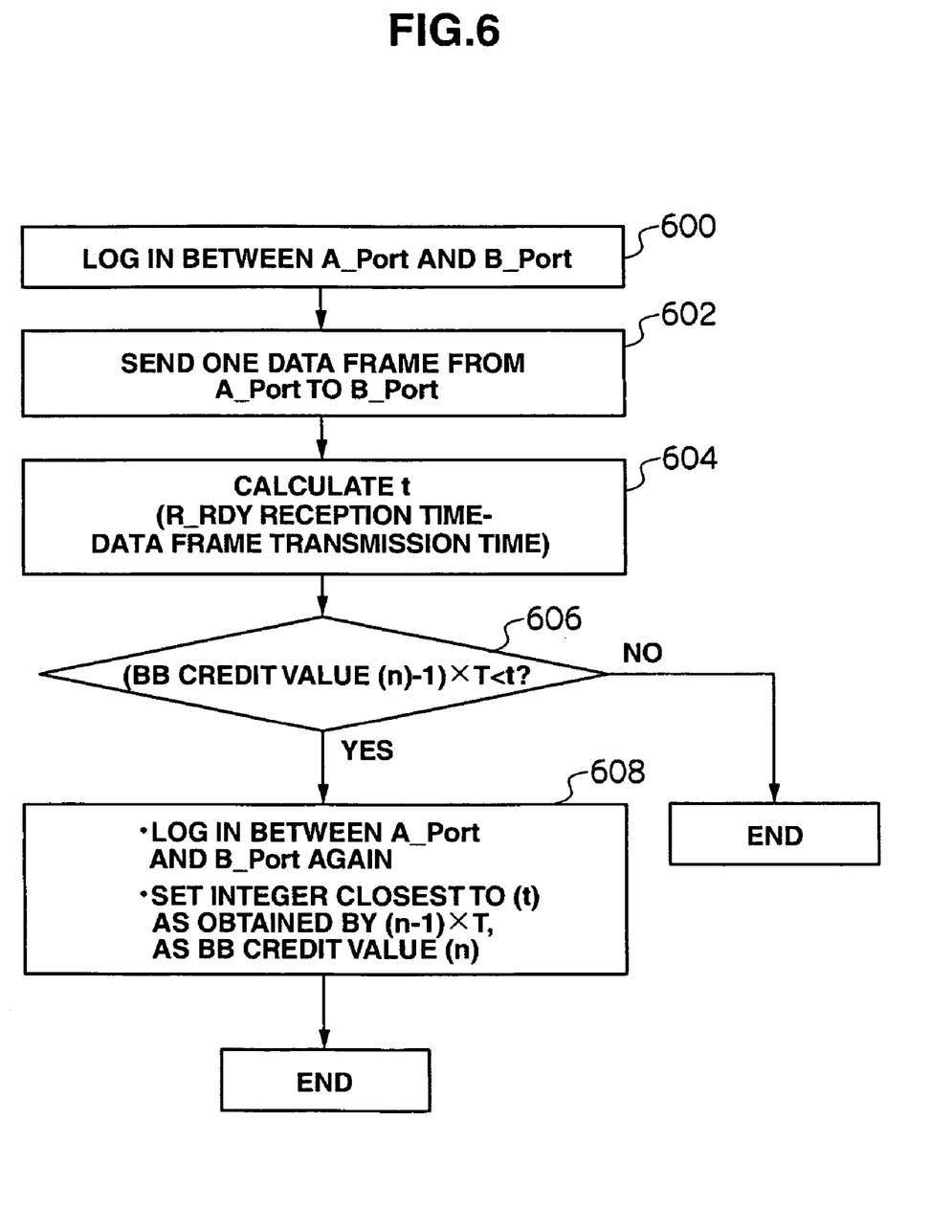
FIG. 6 is a flowchart showing a processing sequence for adjusting the BB credit value according to the data transfer distance between a sender port and a receiver port.

Next, the data transfer operation is described by referring to the flowchart in FIG. 6. The processing sequence described in this flowchart is executed by a microprocessor 112 in the channel adapter provided in the sender storage control unit. In step 600, the microprocessor logs into the storage system 20 (FIG. 2) on the B_Port side from A_Port. The BB credit value set at the time of login is the value initially set in the storage system on the B_Port side. The time of the login between the ports is when the data transfer is started.

In step 602, the microprocessor sends one data frame from A_Port to B_Port. In step 604, the microprocessor calculates the time period "t" required for processing of one frame, using the time at which the microprocessor sent the data frame from A_Port to B_Port, and the time at which A_Port receives R_RDY from B_Port.

In step 606, the microprocessor applies the following formula I, using the time period "t" calculated in step 604 and data frame transmission interval "T" (see FIG. 5):

$$(BB \text{ credit value } (n)-1) \times T < t \qquad \text{[Formula I]}$$

Formula I is used to judge whether the BB credit value enables data frame transmission. If step 606 returns a negative judgment, the microprocessor on the A_Port side determines that the data transfer from A_Port to B_Port is being performed appropriately without being influenced by the transfer distance, and then terminates the processing without changing the BB credit value.

On the other hand, if step 606 returns an affirmative judgment, this means that the BB credit value is not a value enabling data frame transmission from A_Port to B_Port during "tloss." Therefore, the microprocessor logs into B_Port again and sets the integer closest to "t" as obtained by (BB credit value (n)−1)×T) as the new BB credit value, and sets this new BB credit value in the shared memory of the receiver storage system or the local memory of the channel port on the B_Port side (step 608). As a result, data transmission between pluralities of nodes can be performed according to Fibre Channel Protocol while preventing throughput reduction even if the distance between the nodes is great.

Figure 7:
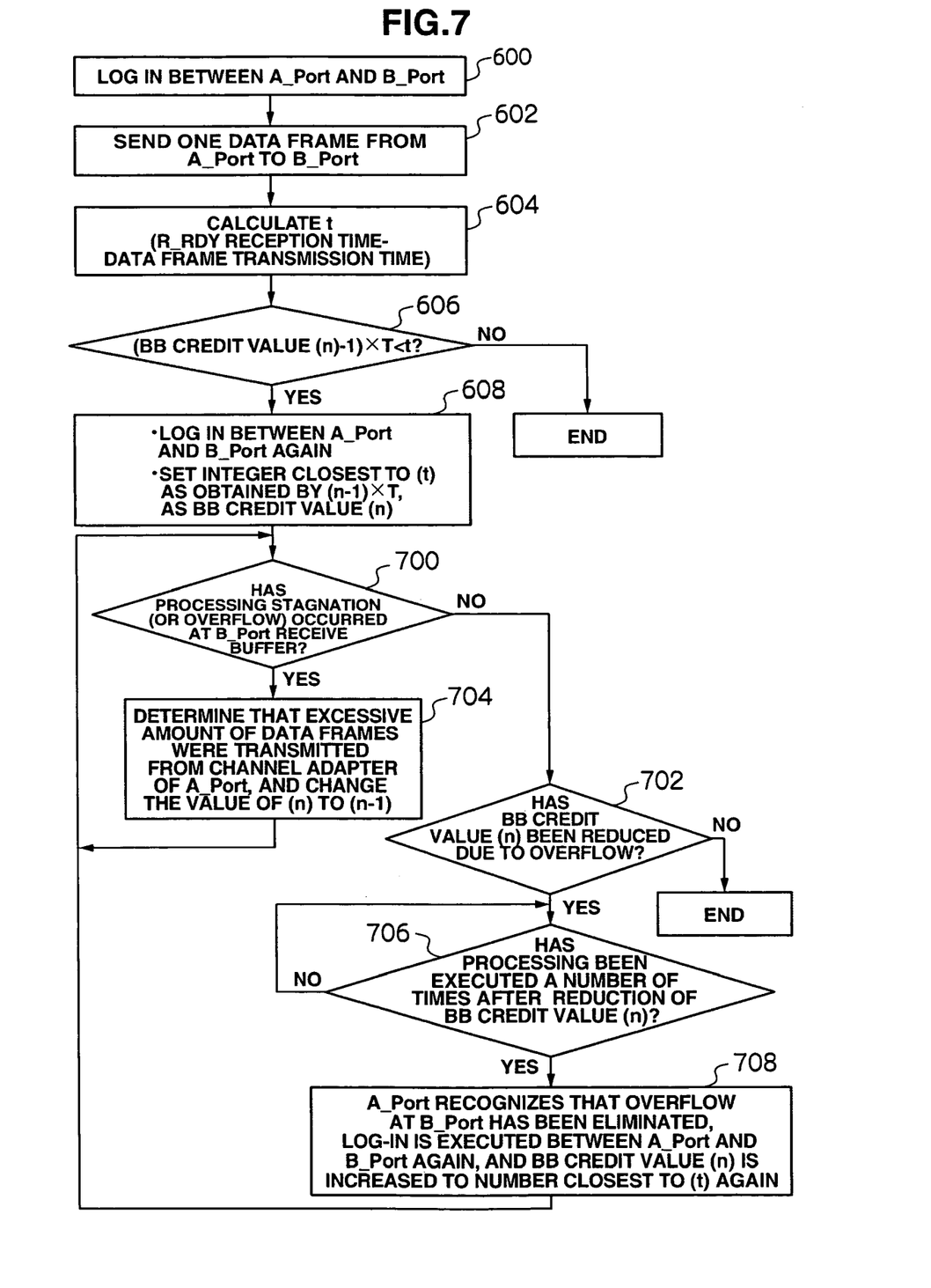
FIG. 7 is a flowchart showing a processing sequence for another embodiment other than that shown in FIG. 6.

FIG. 7 is a flowchart showing a processing sequence for setting the BB credit value according to another embodiment when transferring data from A_Port to B_Port. Steps 600 through 608 are the same as the steps indicated with the same numbers in FIG. 5. In step 700, the microprocessor on the B_Port side checks whether or not the number of data frames sent corresponding to the BB credit value decided in step 608 is more than the number of data frames that can be received by B_Port and whether, as a result, the data frame processing has stagnated and a receive buffer overflow has occurred on the B_Port side and the data transfer has failed. If an overflow has not occurred, the processing proceeds to step 702.

If an overflow has occurred in step 700, the microprocessor in the sender storage system determines that an excessive number of data frames was sent from A_Port, decrements the BB credit value set in step 608 by one, repeats the above-described processing until the overflow at B_Port no longer exists, reduces the BB credit value to be used for data transfer, and attempts to retry the data transfer (step 704). The channel adapter in the storage control unit on the A_Port side makes a judgment concerning the overflow when the relevant control code is sent from the storage control unit on the B_Port side to the storage control unit on the A_Port side.

In step 702, the microprocessor on the A_Port side judges whether or not the BB credit value has been reduced from the number decided in step 608. If the BB credit value has not been reduced, the microprocessor transfers data in an amount corresponding to the BB credit value declared in step 608. If an overflow occurred on the B_Port side and the BB credit value has been reduced, the processing proceeds to step 706. The microprocessor on the A_Port side judges whether or not the processing of the data frames on the B_Port side has finished a number of times (for example, ten or more times in this case). If the processing has not been performed, for example, ten or more times, the microprocessor repeats step 706 until the execution of the processing is completed ten or more times.

If the processing has been completed a number of times in step 706, the microprocessor on the A_Port side recognizes that the overflow on the B_Port side has been completely eliminated, logs into B_Port from A_Port again, increases the BB credit value again to the integer decided in step 608, and then performs the processing for transferring data frames to B_Port. Thereafter, if no overflow occurs on the B_Port side during the processing of the data frames sent from A_Port, the processing described in FIG. 7 proceeds to step 700 and step 702 and then terminates. If an overflow occurs on the B_Port side, the processing proceeds to steps 700, 704, 702, 706, and 708 and the BB credit value is increased or decreased as necessary.

According to this embodiment, the BB credit value can be adjusted based on the data processing status on the receiver side even if the data processing on the receiver side stagnates or an overflow occurs in the receive buffer during the data transfer between the storage control units. As a result, efficient data transfer between the storage control systems can be realized.

Figure 8:
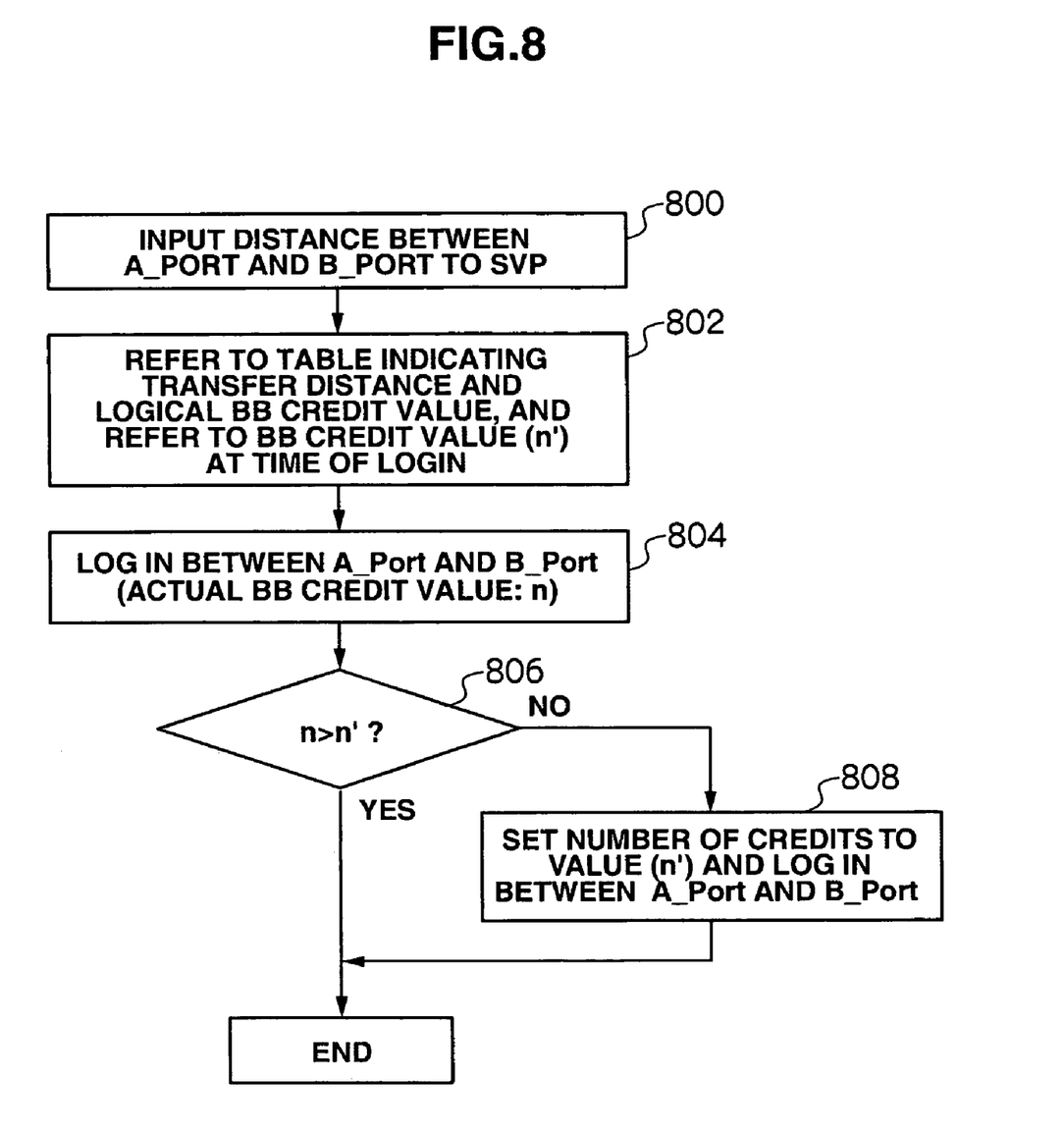
FIG. 8 is a flowchart showing a processing sequence for a further embodiment.

FIG. 8 is a flowchart showing a processing sequence according to a further embodiment of this invention. If the data transfer distance between A_Port for sending data and B_Port for receiving data is known in advance, an administrator inputs a BB credit value corresponding to the distance to the SVP of the storage control unit on the A_Port side (see FIG. 2) beforehand, and registers, in the shared memory 70, the BB credit value in a control data table to be used at the time of data transfer.

Figure 9:
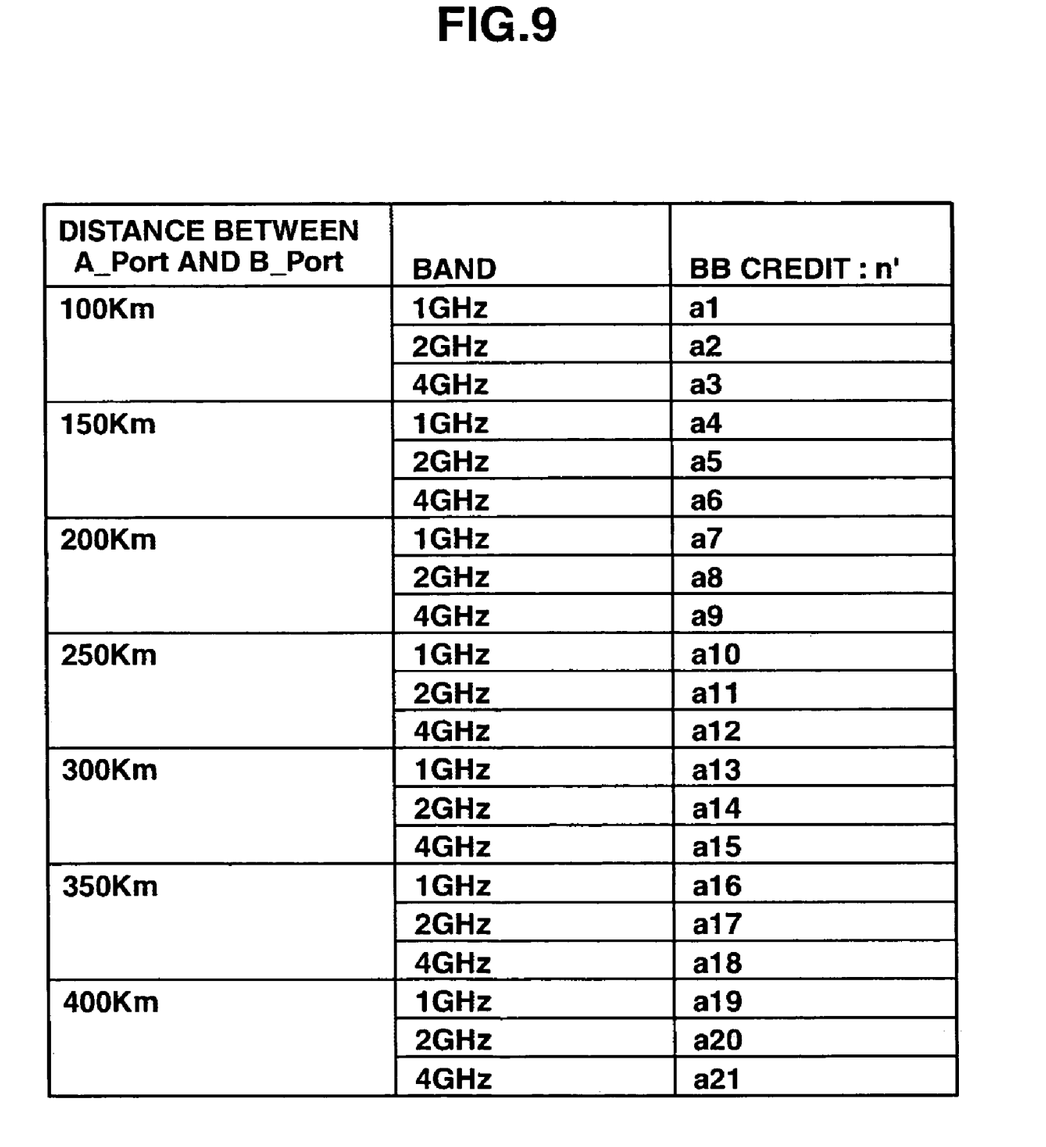
FIG. 9 is a control table showing the relationship of the distance between a sender FC port and a receiver FC port with the BB credit value, and the table is used in the flowchart in FIG. 8.

FIG. 9 is an example of this table in which the BB credit value (n') is defined according to the distance between A_Port and B_Port and the band used for communication. A larger BB credit value (n') is set for greater distances between ports and higher frequencies of the relevant band.

The sender storage control unit on the A_Port side stores the BB credit value (n') corresponding to the data transfer distance, in the cache 60 in advance (step 802). Login is executed between A_Port and B_Port (step 804). The BB credit value (n) previously set on the B_Port side is used for the BB credit value set at the time of login. The time of the login between A_Port and B_port is when data transfer from A_Port to B_Port is started.

The microprocessor on the A_Port side compares the BB credit value (n') in step 802 with the current BB credit value (n) set at the time of login (step 806). If the value (n) is larger than the value (n'), the microprocessor transfers data frames without changing the current BB credit value. On the other hand, if the value (n) is equal to or smaller than the value (n'), the microprocessor changes the BB credit value to (n'), executes login between A_Port and B_Port again (step 808), and transfers data frames in an amount corresponding to the BB credit value (n') between A_Port and B_Port. According to this embodiment, it is possible to maintain high data trans-fer efficiency between the ports even if there is a great distance between the two nodes data is mutually transferred between.

The embodiments above describe data transfer between the second storage control unit and the third storage control unit. However, this invention can be applied to data transfer between two storage control units without an intermediate site. Moreover, the invention can be applied not only to remote copy systems, but also to computer systems and equipment that communicate with each other according to Fibre Channel Protocol.

What is claimed is:

1. A data transfer method for transferring data frames according to Fibre Channel Protocol between a first storage control unit and a second storage control unit in a remote copy system,
   wherein the remote copy system includes the first storage control unit, which is connected to an information processor and sends and receives data to and from the information processor, and the second storage control unit, which is connected via a communication tool to the first-storage control unit and receives data from the first storage control unit, and
   wherein a buffer-to-buffer credit value applied to the data frame transfer is increased according to the distance between the first storage control unit and the second storage control unit, the method comprising the steps of:
   having the first storage control unit log into the second storage control unit;
   sending a specified data frame from the first storage control unit to the second storage control unit;
   measuring the time that elapses between the time the data frame is transmitted and the time a Receiver Ready signal is received by the first storage control unit from the second storage control unit; and
   increasing the buffer-to-buffer credit value based on the elapsed time.

2. The data transfer method according to claim 1, wherein the first storage control unit executes:
   a first step of judging whether the initial value of the buffer-to-buffer credit value enables transmission of the data frame to the second storage unit during the time period between transmission of the Receiver_Ready signal by the second storage control unit to the first storage control unit and reception of the Receiver_Ready signal by the first storage control unit; and
   a second step of increasing the buffer-to-buffer credit value if a negative judgment is returned.

3. The data transfer method according to claim 2, wherein the first step is executed according to the following Formula I:

$$(n-1) \times T < t \quad \text{[Formula I]}$$

where "n" represents the initial value of the buffer-to-buffer credit value, "T" represents the time interval required for transmission of plural data frames sent from the first storage control unit, and "t" represents the time period between transmission of the Receiver_Ready signal by the second storage control unit to the first storage control unit and the reception of the Receiver_Ready signal by the first storage control unit.

4. The data transfer method according to claim 3, wherein the increased buffer-to-buffer credit number is the integer closest to the above-described value "t" as obtained as a result of calculation of the formula "$(n-1) \times T$."

5. The data transfer method according to claim 2, wherein the first storage control unit logs into the second storage control unit again based on the increased buffer-to-buffer credit value.

6. The data transfer method according to claim 2, wherein the first storage control unit decreases the increased buffer-to-buffer credit value if stagnation occurs in a buffer of the second storage control unit during processing of the data frames sent from the first storage control unit.

7. The data transfer method according to claim 6, comprising:
   a third step of having the first storage control unit log into the second storage control unit again based on the decreased buffer-to-buffer credit value; and
   a fourth step of having the first storage control unit further decrease the buffer-to-buffer credit value and log into the second storage control unit again in order to transfer the data frames, if stagnation in processing of the data frames is not eliminated.

8. The data transfer method according to claim 7, comprising a fifth step of having the first storage control unit increase the decreased buffer-to-buffer credit value to the value before the decrease if stagnation in the processing of the data frames is eliminated.

9. A data transfer method for transferring data frames between an initiator node port and a target node port according to Fibre Channel Protocol, the method comprising:
   a first step of having the initiator node log into the target node based on a predetermined buffer-to-buffer credit value;
   a second step of deciding a buffer-to-buffer credit value according to a control table that associates the distance between the initiator node port and the target node port, with the buffer-to-buffer credit value to be applied to the data transfer; and
   a third step of setting the buffer-to-buffer credit value to be actually applied to the data transfer between the initiator node port and the target node port, to the value decided in the second step if the predetermined buffer-to-buffer credit value in the first step is equal to or less than the buffer-to-buffer credit value decided in the second step.

10. A remote copy system comprising:
   a first storage control unit that is connected to an information processor, that sends and receives data to and from the information processor;
   a second storage control unit that is connected via a communication tool to the first storage control unit, that receives data from the first storage control unit;
   a copy control circuit for remote-copying a logical volume in the first storage control unit to a logical volume in the second storage control unit; and
   a transfer control circuit for transferring data frames in the first storage control unit to the second storage control unit according to Fibre Channel Protocol, wherein the transfer control circuit increases a buffer-to-buffer credit value to be applied to the data transfer, according to the distance between the first storage control unit and the second storage control unit.

* * * * *